Feb. 8, 1938.  C. BILLAND  2,107,814

MOLDING BY SAND BLOWING

Filed Aug. 7, 1935  5 Sheets-Sheet 1

Inventor
Carl Billand
By Watson, Coit, Morse & Grindle
Attorneys.

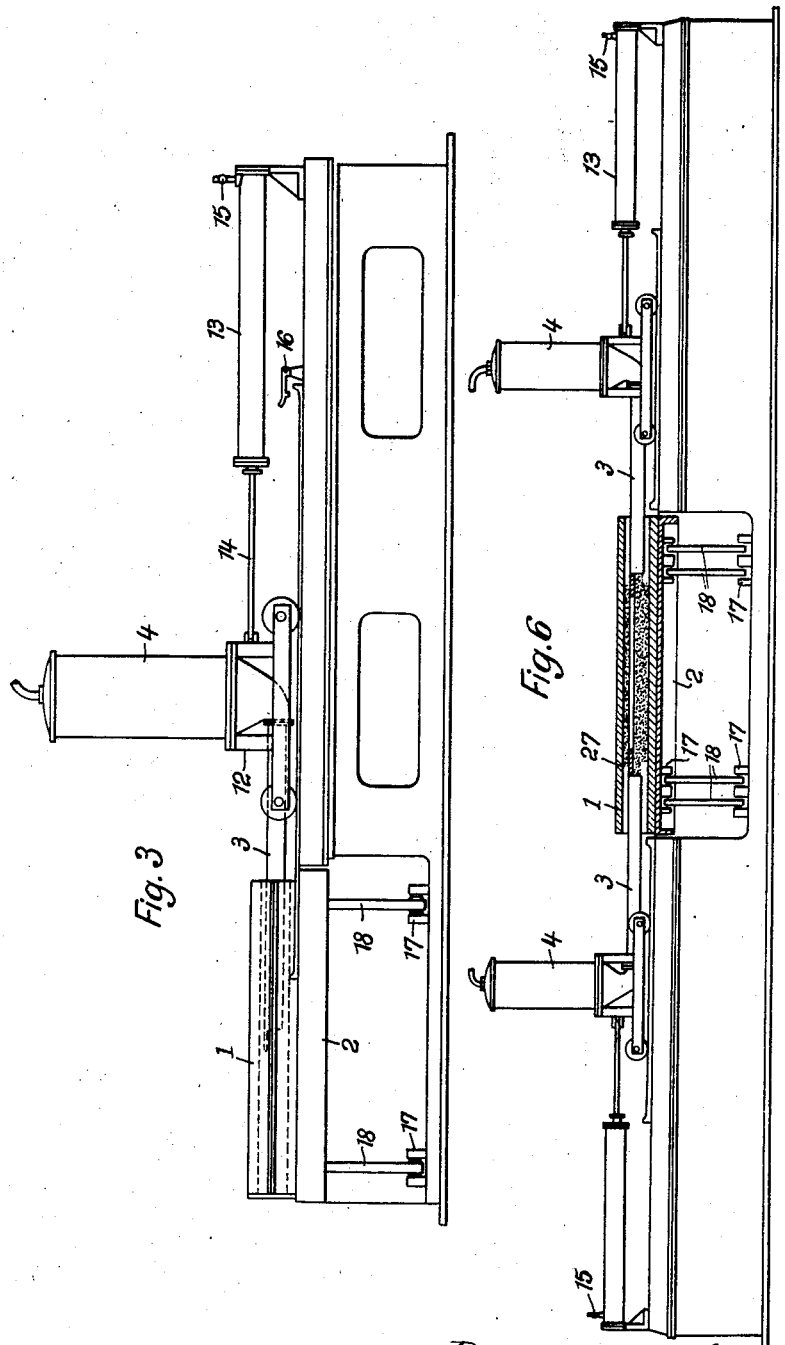

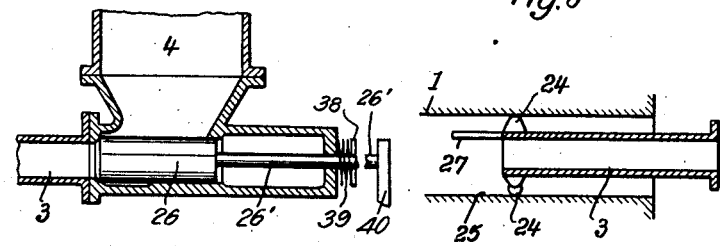
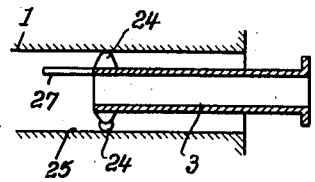
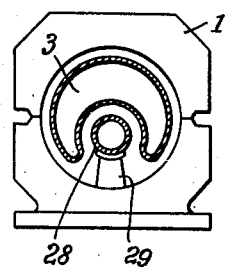
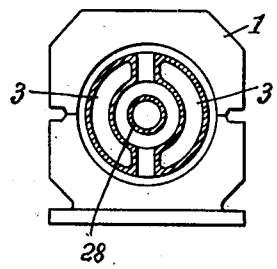
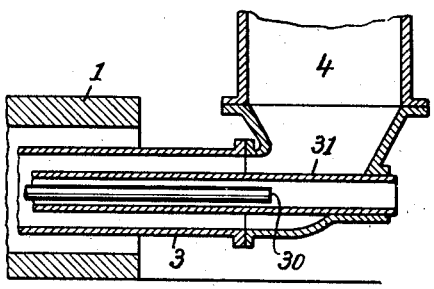
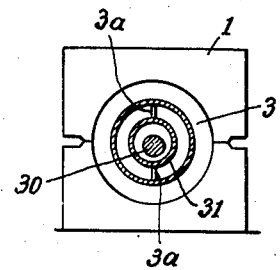

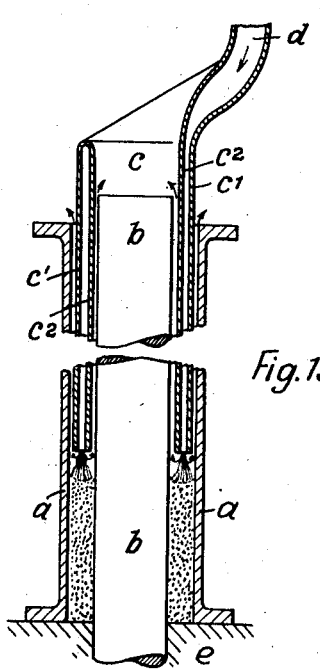
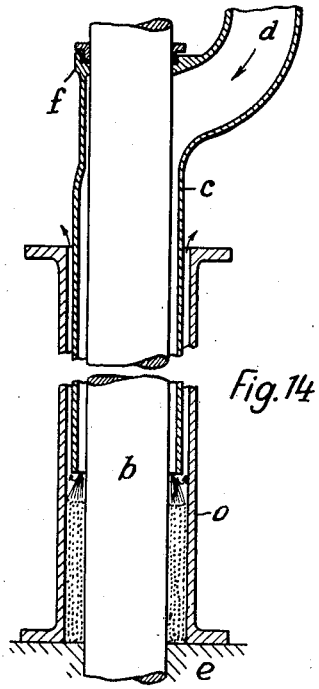
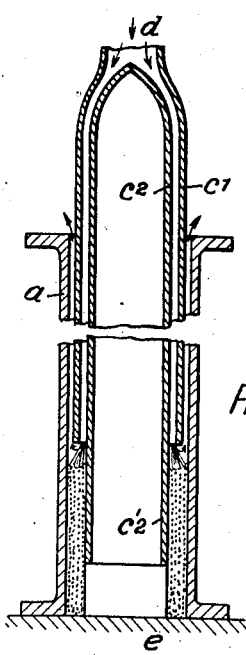
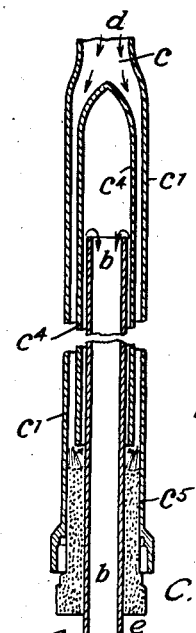

Feb. 8, 1938. C. BILLAND 2,107,814
MOLDING BY SAND BLOWING
Filed Aug. 7, 1935 5 Sheets-Sheet 5
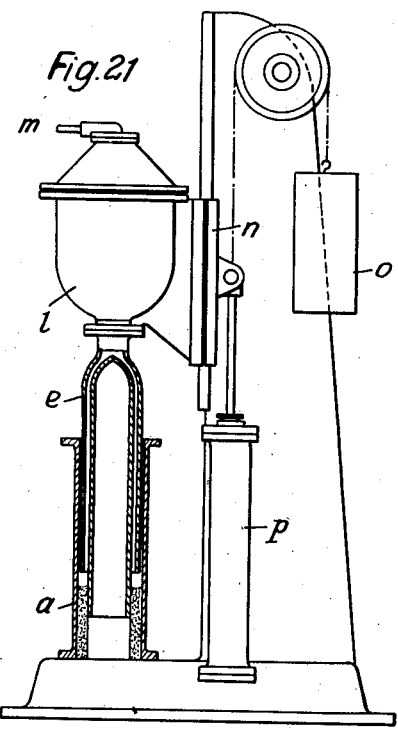
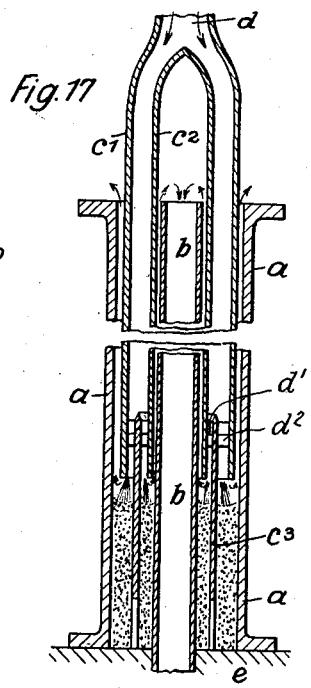
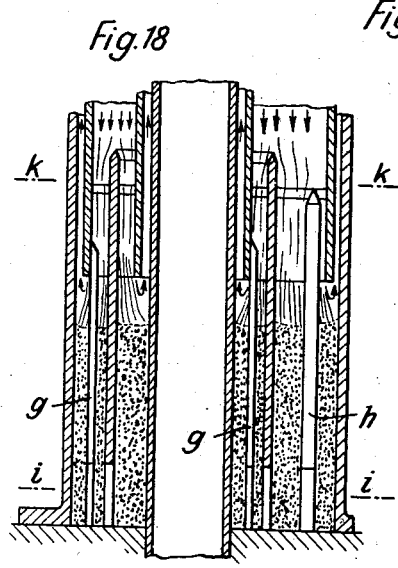
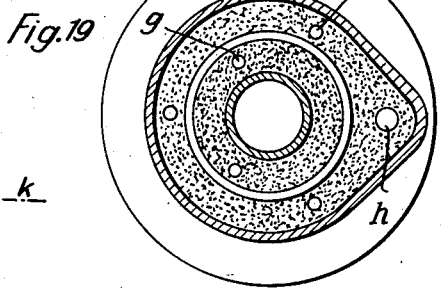
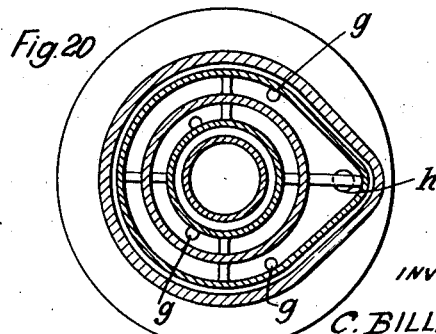

Patented Feb. 8, 1938

2,107,814

UNITED STATES PATENT OFFICE 2,107,814

MOLDING BY SAND-BLOWING

Carl Billand, Kaiserslautern/Rheinpfalz, Germany

Application August 7, 1935, Serial No. 35,134 In Germany May 31, 1934

20 Claims. (Cl. 22—36)

The invention relates to a method for the production of blown sand-cores and molds, particularly of green sand.

It is already known to blow the sand into boxes with the assistance of stationary blast-nozzles arranged outside of the boxes or of blast nozzles mounted on the boxes. This method has the disadvantage that the air enclosed in the boxes and the additional air entering the boxes during the blowing could escape, during the short blowing operation, either not at all or incompletely only. Consequently, there were formed, in the sand-structure, loose places which made the molds useless. Also, with apparatus of that kind, it was impossible to produce molds or cores of considerable lengths, firstly because the enclosed quantity of air was then larger and secondly because the energy of the jet was lost on the way from the blast-nozzle to the remote end of the box, particularly as the enclosed air offered an obstruction similar to that of a compressed cushion.

The above mentioned disadvantages are obviated by the invention. The method according to the invention consists in introducing one or more sand-blast nozzles into the core or mold-box and imparting to the blast nozzles and the box a motion relatively to each other corresponding to the progressive filling with sand. This may be effected, for example, by utilizing the reaction-movement of the issuing sand-jet to move the blast nozzle or nozzles, introduced into the stationary box, out from the latter as the filling with sand progresses. However, it may also be effected by arranging for the blast nozzle or nozzles to be fixed and utilizing the power of the issuing sand-air jet to drive the movably mounted box forwardly. Finally, it is possible to arrange both the box and also the blast-nozzle or nozzles so that they can move. In every case, the extremely advantageous result is achieved that air-cushions cannot form within the box during the blowing. On the contrary, the sand is deposited in the box in such manner that it drives the air in front of it away and out of the box.

A second very important advantage is that the sand-jet executes only a very short path from the blast nozzle to the point of application and consequently, retains practically its complete jet-energy. A very firm and uniform mold results. Also this fact has the result that, in comparison with the known apparatus, a considerably smaller jet-energy need be applied in order to obtain a useful mold. This amounts to the same thing as the fact that considerably less additional air is introduced into the box than was the case with the known apparatus.

The method according to the invention is thus distinguished by a very precise manner of operation and a correspondingly accurate mold. Also, there is an important difference from those known forms of apparatus wherein the wall of the rotating box is covered with mold material from centrally disposed feed jets similarly to the centrifugal casting process. For such apparatus it is an important factor that the material flowing out from the nozzle radially of the box should only encounter a part of the box-wall at a time. The remaining part of the box-wall is progressively brought in front of the fixed nozzle by the rotation of the box. No boundary for the mold material is present towards the inside so that there is no assurance of a precise formation. Also such a process, which is to be regarded as a spraying process, requires a very considerable time. Furthermore, a core cannot be produced at all by such a process.

In contrast thereto, the blowing process according to the method of the application is completed in a surprisingly short time, since the mold material flowing out from the blast nozzles distributes itself uniformly over the entire cross-section of the mold or core-box. The mold material completely fills the cross-section accessible to it, so that a very exact core or a very exact mold is produced.

A further advantage of the method according to the invention is that it is possible without difficulty to introduce a core-iron and the like in conjunction with the blowing operation, this being of particular importance in the production of green cores. Also, in the same operation, air-channels can be produced by providing the nozzle-head with rod-like projections or the like.

Such projections for the formation of air-channels are per se known for core-machines wherein the sand is pressed into the mold by means of a screw or the like.

The invention is applicable for the blowing of hollow sand mold devices as well as for solid sand core devices. For this purpose, nozzles may be used in combination with cores or pattern devices, so that sand is blown into the space between the mold box and pattern device. Alternatively, the pattern device, if hollow, may be charged with sand from the inside, in which case it serves as a mold box. Finally, a hollow pattern device, disposed in a mold box, may be charged with sand on both sides so as to produce simultaneously a sand mold and a sand core, suitable for the casting of a tubular object. The pattern device may partake of the relative movements hereinbefore described. Also, pattern extensions or prolongations may be provided for producing the formation of passages, cavities and so on.

Further details of the invention will appear from the following description of several embodiments which are illustrated by way of example in the drawings. In the latter:—

Figure 3 illustrates an apparatus similar to Figure 2, but arranged horizontally.

Figure 6 shows the machine of Figure 3 with duplicated parts.

Figure 7 is a detail view of a sand and feed control device.

Figure 8 is a detail view of a nozzle device.

Figures 9, 10 and 11 are cross sections through different nozzle and mold box embodiments.

Figure 12 is a longitudinal section of the apparatus seen in Figure 11.

Figures 13 to 18 are central vertical sections illustrating different mold box arrangements with pattern devices and nozzles adapted for giving an annular blast.

Figure 19 is a cross section on the line *i—i* of Figure 18.

Figure 20 is a cross section on the line *k—k* of Figure 18.

Figure 21 is a sectional elevation of a machine embodying a nozzle and mold box arrangement similar to that shown in Figure 15.

Figure 1:
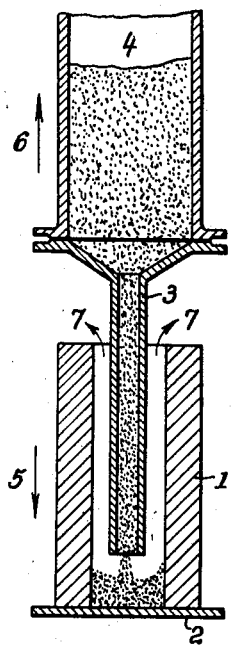
Figure 1 is a longitudinal section, diagrammatically represented, through apparatus for carrying out the method.

In the example illustrated in Figure 1, the mold or core-box I stands upon the base 2. The blast nozzle 3 which is attached to a sand-vessel 4 is inserted into the box I. Between the nozzle 3 and the box I, as is evident from Figure 1, there is left an annular space the object of which will be readily appreciated from the following description of the manner of operation of the apparatus.

As explained at the commencement, it is important for the invention that air-cushions should be avoided in the formation of the mold. On this account, the nozzle 3 is preferably inserted so deeply into the box that the quantity of air in front of the nozzle has still the opportunity to escape laterally and around the nozzle. In this way, there is produced at once a sand-accumulation such as is indicated in Figure 1. It will be recognized also that owing to the slight distance between the nozzle-mouth and the box-bottom, or the sand-layer situated in front of the mouth, the sand is deposited with a high jet-energy. As the sand-filling progresses, the box I and the nozzle 3 move apart relatively to each other, as indicated by the arrows 5 and 6. During the whole of the operation, the air has the opportunity to escape unhindered between the nozzle-body 3 and the inside of the mold-wall, i. e., through the aforesaid annular space, in the direction of the arrows 7. The relative movement between the box I and nozzle 3 may be brought about in various ways, but preferably in such fashion that the power of the issuing sand-jet is utilized for the purpose of producing the respective movements. Thus, with a stationary box I, the reaction-effect of the issuing sand-air jet may cause rearward movement of the nozzle 3. With a stationary nozzle, however, the impact-force of the issuing sand-air jet may also drive the movable box from in front of it: Finally, the power of the issuing sand-air jet may set both the nozzle and also the box in movement. In some cases it may also be advantageous to modify the power of the issuing sand-jet, for example, by the employment of an additional driving force which, for the first part of the time, initiates the movement of the comparatively heavy masses, leaving it then to the power of the issuing sand-air jet to continue the further movement.

Furthermore, in order to produce as uniform a core as is possible, care should be taken that the movements are maintained suitably under control. For this purpose it may be advantageous to apply braking forces towards the end of the movement, to which further reference will be made below. The illustration in Figure 1 has been made diagrammatic only. Self-evidently, several blast nozzles may also be provided at a time.

Figure 2:
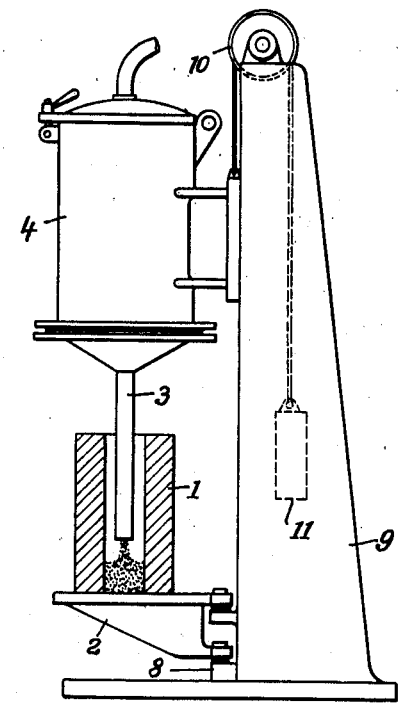
Figure 2 shows the apparatus of Figure 1 embodied in a machine.

Figure 2 shows the arrangement, illustrated more diagrammatically in Figure 1, in a form of construction suitable for practical use. The base 2 for the mold I is mounted horizontally at 8 on the column 9. The provision for swinging has the advantage that, after the completion of the molds, these may be moved out of the otherwise disturbing reach of the blast-nozzle 3. Obviously, also, the nozzle may be made swingable with the mold stationary or, alternatively, both may be made oppositely adjustable. The sand-vessel 4 is carried by a slide which is guided on the vertical face of the column and of which the supporting rope is carried over a pulley 10 and supports a counter-weight 11. In operation, the reaction of the issuing sand-air mixture provides a drive for the sand-vessel 4 which is to be taken into account, in accordance with known rules, in designing the weight 11. The reduction of weight of the vessel 4 occurring with the blowing out of the sand may be compensated for by further known means, for example by making the weight 11 in several parts, as in apparatus for testing materials, in such fashion that, in its descent, individual parts of it are gradually taken up, i. e., removed from it by projections extending into its path. Instead of gradually reducing the descending weight, it is also possible to increase the weight of the rising sand vessel 4, for example, by gradually increased loading by means of so-called loading weights. For the inventive idea, details of construction in this respect are not important, since it is simply a question of preventing an acceleration of the nozzle movement which would possibly disturb the uniformity of compression of the sand in the mold, since the density and firmness of the blown mold are dependent upon the speed of recession of the nozzle. Control and braking devices of other kinds may naturally also be employed.

The example of Figure 3 shows a horizontal installation which can be used with advantage when the mold, owing to its length, renders a vertical disposition too complicated or a core must in any case be brought into the horizontal position to be lifted out from the core-box.

In Figure 3, the sand-vessel is arranged on a carriage 12 running on horizontal rails and connected with the pressure-air or fluid cylinder 13 by a piston-rod 14. The latter moves the sand-vessel 4 together with the blast-nozzle 3 into the horizontal mold 1. In this case, the cylinder 13 itself is preferably used for braking the reaction-force arising during the blowing. For controlling the movement, there is provided at 15 an adjustable air-vent valve whereby the speed of recession of the table with the nozzle can be precisely controlled. If conditions of space require it, the cylinder 13 may naturally also be disposed beside or under the apparatus or the track for the table 12. When the cylinder is operated with pressure-fluid, the fluid flowing out during the return movement can be re-collected by a separate vessel. In conjunction with the arrangement of Figure 3, the drive for the table-movement and the braking may naturally also be effected by electrical means. At 16 there is also indicated a catch device which holds the carriage in the end-position in order to prevent its accidental forward movement.

Figure 4:
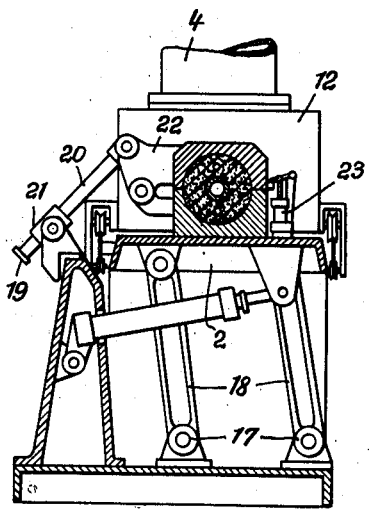
Figure 4 illustrates in sectional elevation an apparatus in accordance with the invention embodied in a machine with swingable mountings.
Figure 5:
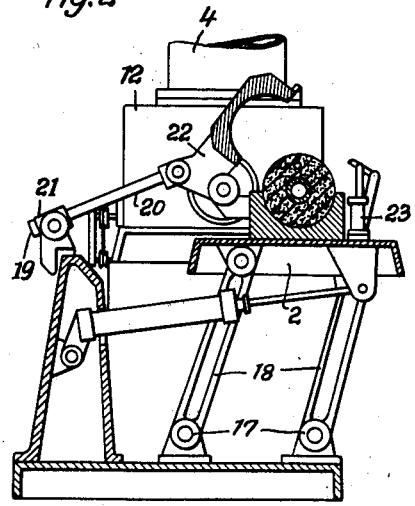
Figure 5 shows the machine of Figure 4 in a different operative condition.

As, with the arrangement of Figure 2, the support 2 for the mold 1 is swung laterally about the pivots 8 for changing the said mold, so also with an installation in accordance with Figure 3, the horizontal table 2 is advantageously similarly constructed, for example as illustrated in Figures 4 and 5 in end elevation partially in section. In order that the blast-device may be laterally immovable, the table 2 is mounted upon arms 18 to swing about the supporting points 17, so that it has a parallel movement, i. e., its horizontal position is always maintained. Pressure cylinders indicated in the drawings may serve for its movement and its lateral movement is preferably also employed for the opening of the mold. When, after the completion of the blowing operation, the table 2 is moved to the right, the projection 19 on the rod 20 abuts against the eye 21 and thus draws up the upper half of the mold by means of the lever-arm 22. When the table is swung back, the upper half of the mold falls back into the closed position and is then held closed by a locking device 23 during the blowing. As indicated by the drawings, the locking may conveniently be effected automatically.

For particularly long molds or cores, it is advantageous to guide the blast-nozzle during its withdrawal movement in order to avoid vibratory or so-called fluttering movements. For this purpose, as illustrated in Figure 8, the blast nozzle is provided at its end with guide-protuberances or rollers 24 the path 25 for which is formed by the mold or core box itself.

It is, however, also possible to facilitate a quiet vibration-free withdrawal movement of the blast-nozzle in another fashion. This may be achieved simply by using two blast nozzles which are introduced simultaneously from the two ends of the suitably long mold. These are correspondingly shorter and more stable than one long blast nozzle designed for the same purpose and they therefore operate with greater freedom from vibration. The use of two blast-nozzles may also be advantageous for other reasons, e. g., for the molding in of core-supports. With this arrangement, it is not necessary that the nozzles, shortened in length as compared with the use of one nozzle only, should both be of the same length. In any event, the effect is obtained that the two sand-jets meet each other in the middle or in a central part of the mold and thus to a certain extent compress one against the other.

Figure 6 shows two such nozzles 3 with the respective sand-vessels 4 during the blowing operation. At the commencement of blowing, i. e., when the mold still has no filling of sand, the air blown in by each nozzle can escape from the mold into the open at the opposite end, flowing away around the nozzles along the wall of the mold.

If both blast-nozzles are working together, the two sand-jets meet each other between the nozzle mouths and initially form a kind of sand plug within the mold. Alternatively, however, one nozzle alone may initially be blown with, in which case a counter-member for the said nozzle, for example, in the form of a transverse wall, upon which the sand impacts, should be inserted in the mold. In this fashion it is possible to blow a long core from two ends in two sections one after the other in turn. The aforesaid wall may remain in the blown mold or may be removed before the other end of the mold is filled from the other nozzle.

The method herein described can be appropriately applied also to more than two nozzles.

As illustrated in Figure 6, the two braking cylinders 13 are each connected with their blast nozzle 3 and their sand vessel 4. Also there is the swingable table 2 resting on the arms 18, which facilitates the convenient lifting out of the molds or cores. If two or more molds are arranged on a table, the operation may be so controlled that whilst one mold is swung out for the removal of the sand core the second mold is situated in front of the blast nozzles and is filled. After the completion of the blowing operation, the mold emptied in the meanwhile is then brought by the swinging movement of the table between the nozzles and the filled mold is then emptied, cleaned and so forth during the next blowing operation. Also the arrangement may furthermore be such that the swinging of the core box or of the molds in front of the blast nozzles is effected about a horizontal ax's, disposed in the middle, of the vertically disposed box. Similarly a horizontally disposed core box may be arranged about a vertical axis, i. e., in the manner of a rotary disc. The two cylinders 13 are preferably coupled together by hydraulic control means or other means in such fashion that they are constrained to execute corresponding but opposite movements.

When the filling of the mold has been completed, the reaction force of the returning nozzle is preferably utilized to introduce, at the end of the movement, a valve rod 26' and with it a valve body 26 into the nozzle opening and to close the latter, as illustrated in Figure 7. The valve body 26 and rod 26' are normally maintained out of the nozzle opening by means of a spring 39 which abuts against a pin 38 extending through the rod 26'. As the nozzle nears the end of its backward movement, the rod 26' comes in contact with a fixed abutment 40, suitably secured to the frame of the apparatus, and as the backward movement of the nozzle continues, the valve body 26 is projected into the nozzle opening. In this fashion then the sand supply from the vessel 4 to the nozzle is cut off so that, on the one hand, no more sand is blown out and air consumed than is necessary for the mold and, on the other hand, the sand remaining in the sand vessel is available for the filling of the next mold.

Appropriate use may also be made of other cut-off devices, for example diaphragms, valves and the like, whereof the actuation is effected by inlet and outlet valves controlled by the movable nozzle.

With all molds produced with sand the provision of air channels for conducting away the gases evolved during casting is important. In the production of molds by hand rods or cords are molded in and are then withdrawn again from the finished sand mold.

In accordance with the invention, the production of such channels is effected at the same time as the molding and, moreover, in such fashion that a further advantage is also achieved at the same time, i. e., the vibration-free movement of the blast nozzle is facilitated. For this purpose, the blast nozzle 3 as illustrated in Figure 8, is provided at its ends with a (if necessary also several) pin-like projection 27 located in the direction of its length, around which the sand is compressed at the commencement of the blowing. If, now, the nozzle 3 moves out from the mold, i. e., from left to right in Figure 8, then the pin 27 always remains in the line of prolongation of the channel formed by it and thus draws out a continuous air channel in the sand mold, as is illustrated in Figure 6. Since the pin 27 slides in the channel formed by it itself and closely enclosing it, it thus forms, as already stated, a nozzle-guide which is of considerable value especially in the case of long molds.

In the case of cores without core-irons, i. e., dried cores, the shape of the nozzle is not important. This however is not the case with cores which are employed undried, i. e., receive a core-spindle. Figure 9 illustrates by way of example an arrangement for a nozzle cross section which is suitable for the simultaneous embedding of a core-iron. The core-iron, which may naturally have any desired cross section and so forth, is assumed in Figure 9 to be a rigid tube 28. The blast nozzle 3 is crescent shaped in cross section or is formed as part of the cross section of a circular ring in order that it may be able to travel without obstruction over the supports 29 bearing the core-iron. If not only lower but also upper supports are to be molded in with the core-iron, then it is to be recommended that use should be made, in accordance with Figure 10, of segments of an annular nozzle.

Figure 12 illustrates in a part longitudinal section an annular nozzle 3 wherein the core-iron 30 is inserted in simple fashion in a central tube 31 which is open at both ends. With this construction the blast air may flow out not only in the hollow space between the mold and nozzle body but also through the central tube 31 along the core-iron so that in this case the conduction away of the air is particularly well provided for. This form of nozzle may naturally also be employed without a core-iron being inserted.

In the case of the molding in of core-supports, and also in any case of a not wholly regular mold-shape, it may be advantageous to impart a certain direction to the sand in blowing it into the mold. This may be achieved by the incorporation of blade like transverse parts in the nozzles. In Figures 12 and 11 the connecting pieces 3a between the nozzle body 3 and the central tube body 31 may advantageously be utilized for this purpose. Suitably shaped, these incorporated parts then impart to the sand at its emergence from the nozzle a spiral like movement.

There is naturally no necessity for the nozzles to move in a straight line as is the case in the examples illustrated. Curved nozzles may also be used for correspondingly curved core boxes or the like. In particular also, in place of a long tubular rigid nozzle, use may be made of a jointed tube or a hose which is suitably guided during the inward and outward movement and which can be made to conform to a considerable extent in its shape with the mold to be blown. Naturally also two or more blast nozzles may be arranged and operated at angles to one another.

In order, with installations which are provided, in the fashion of Figure 6, with two or more oppositely acting blast nozzles, to impose their opposite but otherwise corresponding movement, the pressure cylinders 13 may be suitably provided with a common hydraulic control or other control means.

As already mentioned, the nozzle inserted into the mold constitutes a means for determining differently, or as desired, the distance of the actual compressing point from the operating point, that is the point at which the sand is heaped up. In particular the greatest density possible may be obtained with the nozzle mouth at the existing sand filling or in the sand filling actually being formed. By different selection, for each case, of the nozzle distance from the latter point, the density of the sand packing may be controlled whilst employing a constant blowing pressure. Control may, however, also be obtained by variation of the blowing pressure. It has proved in experiments that, when using the usual blowing pressure of six atmospheres, the sand was packed too tightly. By reducing the blowing pressure it was then readily possible to adjust the firmness differently.

The long blast nozzle introduced into the mold has however yet a further resultant advantage which is very important in practice when a core-iron is employed. As is known, a liquid, for example lime-water, is applied to core-irons before their introduction in order to facilitate the adherence of the sand to them. By the sand blown in, which moves along the core-iron, this liquid would not only be brushed off from the core-iron but would be largely transferred to the mold wall and, mostly, irregularly at that. The result would then be that the sand would adhere not to the core iron but to the mold wall and consequently the core would be damaged upon removal. The nozzle introduced into the mold close to the operating point conducts the compressed air past the core-iron and thus keeps it away from the latter. This applies at least to the largest part of the length of the core-iron which comes into contact with the compressed air only beyond the nozzle mouth and, moreover, only over the short distance between the nozzle mouth and the sand packing actually being formed. This protective action for the liquid applied to the core-spindle is further enhanced when the core-iron lies in a tubular or hollow body 31 as in Figures 11 and 12.

Figure 13 illustrates the blowing of a sand-mold in a tubular mold-box $a$ over a cylindrical pattern $b$ arranged in the middle of the box $a$. The blast-nozzle $c$ is annular and comprises an outer shell $c'$ and inner shell $c^2$ and is introduced between the box $a$ and pattern $b$. The air-sand mixture is fed to the annular nozzle $c$ from the supply connections $d$. The sand delivered by the blast-nozzle $c$ comes upon the bottom $e$ and deposits firmly between the box $a$ and pattern $b$. As this deposit grows, there occurs between the nozzle $c$ and the mold a relative movement which removes the blast-nozzle $c$ from the mold so that the whole mold becomes filled. The air introduced with the sand-air mixture escapes to the outside on the one hand between $a$ and $c^1$ and on the other hand between $b$ and $c^2$ as indicated by arrows. After the completion of the blowing operation, the pattern $b$ is withdrawn either downwardly or upwardly. In Figure 14, the blast-nozzle $c$ is a simple cylinder penetrated by the pattern $b$ and sealed against the pattern as by a stuffing box or the like $f$. The sand-air mixture supplied to the nozzle $c$ by the connection $d$ passes between the pattern $b$ and the interior of the nozzle $c$ to the outlet orifice of the nozzle $c$. Here the sand fills the mold-space, whilst the air escapes around the nozzle orifice and through the gap between $a$ and the wall of the nozzle $c$ as indicated by arrows. The rest of the operation is the same as in the case of Figure 13.

The pattern may be fixedly connected with the blast-nozzle, so that, if the nozzle moves, the pattern moves with it.

According to Figure 15, a double walled blast nozzle $c$ with connected outer and inner walls $c^1$ $c^2$ is introduced so far into the mold-box $a$ that the inner wall $c^2$, with its end $c^4$ extended in relation to the outer wall $c^1$, encounters the base $e$ of the mold or passes downwardly through the latter. The blowing operation is then as in Figure 13. The ejected sand deposits firmly, commencing from the base $e$, between $a$, $c^4$ and $e$. When the mold is filled up to the blast-nozzle orifice, the blast-nozzle $c$ moves outwardly relatively to the mold box $a$ filling the space $a$, $c^4$, $e$ over the whole movement, the extended nozzle-end $c^4$ acting as a pattern and being simultaneously withdrawn. During the blowing operation, air escapes through the gap between the mold-box $a$ and the outer wall $c^1$ of the blast nozzle as shown by arrows. If the inner wall $c^2$ is disconnected from the outer wall $c^1$ of the blast nozzle and is not carried along in the movement out from the mold box $a$ then an example in accordance with Figure 14, but without a stuffing box, is obtained. In this case, the parts $c^2$ $c^4$ would have to be withdrawn subsequently.

According to Figure 16, a sand core is blown instead of a sand mold, but in the same fashion. The centre is the hollow core-spindle $b$ which is secured in the base $e$. Over the core spindle $b$ slides the double-walled blast-nozzle $c$, with the outer wall $c^1$ extended prolonged by the extension $c^5$ in relation to the inner wall $c^2$. The blowing operation is as in Figure 15 after the extension $c^5$ has descended on to the base $e$. The blowing operation continues during the relative movement. The core-sand collects around the core-spindle. The extended end $c^5$ of the outer shell $c^1$ of the blast nozzle acts as a mold box. At the completion of the blowing operation, the box $c^5$ is withdrawn. In this example, the air introduced escapes through the gap between the inner shell $c^2$ and the outer wall of the core-spindle $b$ to the end $b^1$ thereof where it is reversed, as indicated by arrows, to escape into the open through the bore of the core spindle $b$.

Figure 17 is a combination of the arrangements in accordance with Figures 15 and 16. The hollow core-spindle $b$, which penetrates through the base $e$, is arranged in the mold-box $a$. The double-walled blast-nozzle $c$ extends over the core-spindle $b$ into the space between $a$ and $b$. In the example illustrated, the outer wall $c^1$ and the inner wall $c^2$ of the blast nozzle are of equal length. If special circumstances require, they may be made of different lengths. Between the outer wall $c^1$ and the inner wall $c^2$, there is introduced at the end of the nozzle a tubular piece $c^3$ which in this case simultaneously serves as a core for the mold box $a$ and as a mold box for the core $b$. The dimensions must therefore correspond to the intended dimensions of a pipe to be cast by the aid of the sand mold and sand core thus produced. Before the commencement of blowing, the blast-nozzle is introduced so far into the mold that the tube $c^3$ rests on or penetrates through the base $e$. The sand-air mixture enters at $d$ into the double wall nozzle $c^1$, $c^2$ and, at the end of the nozzle, is distributed, by the tube $c^3$ both to the mold box $a$ and also to the exterior of the core piece $b$, so that a sand mold and sand core, are blown simultaneously. Also in this case, during the blowing operation, there occurs a relative movement between the mold box $a$ and core $b$ on the one hand and the blast nozzle on the other hand. The air escapes partly through the gap between the mold-box $a$ and the outer shell $c^1$ and partly between the inner shell $c^2$ and the core-spindle $b$ to the end thereof and then, after reversal, through the hollow space in the core-spindle $b$ into the open. The arrangement of the apparatus may also be such that the tube $c^3$ is introduced farther into the blast nozzle $c$ so that by making suitable connections with the divided nozzle spaces, the sand core and sand mold are blown from respective sand vessels. This may be advantageous when, for some reason or another, the two are to be produced with different kinds of sand.

If the sand mold or the sand core or both are to have so-called air-channels then the walls or shells $c^1$ $c^2$ of the blast nozzle are provided, in accordance with Figure 18 with parts $g$ which, in the progressive movement of the blast-nozzle, leave behind air-channels in the mold and core. These parts may be rigid or movable. Pouring channels $h$ may also be formed in the same fashion.

In order to prevent firm adherence of the blown sand to the patterns or core supports of the nozzle, the core supports may be given a rotary movement, either alone or together with the blast nozzle, during the blowing operation, i. e., simultaneously with the longitudinal movement. Thus the member $c^3$ (Figure 17) may be rigidly secured to the walls $c^1$ and $c^2$ of the nozzle by arms $d^2$ and $d^1$ respectively. The rotary movement may be effected either by a separate drive, etc., or by reason of the fact that the blast nozzle is given, in its longitudinal movement, a kind of spiral movement in a special guide plate. In this case the use is recommended of flexible or specially shaped parts $g^1$ serving for the formation of air-channels.

Figure 21 illustrates the general arrangement for such a blowing apparatus. The double-walled blast-nozzle $c$ (Figure 15) with the sand-vessel $l$ arranged above it projects into the mold-box $a$. The sand-vessel is in communication with a source of air by a pipe $m$. The sand-vessel $l$ or the nozzle $c$ is guided at $n$. The weight of the moving parts may be wholly or partially counterbalanced, as by a weight $o$. The cylinder $p$ may initiate the movement or may also influence it in a controlling fashion.

It is evident that the whole arrangement may also be disposed horizontally. It is likewise possible to blow several sand molds and sand cores simultaneously.

For the practical manufacture of pipes, for example, the molds and cores to be blown may be arranged upon a horizontally movable rotary frame. Similarly the blowing device may also be movable. The invention is not restricted to the production of cylindrical sand molds and sand cores but also extends to such formations intended for all objects of suitable shape.

I claim:—

1. In combination, opposed sand blast nozzles, a mold box arranged between and oppositely penetrable by said nozzles, guided carriages for said nozzles, and control means operative for ensuring corresponding but opposite movements of said carriages during sand blowing.

2. In combination, a sand blast nozzle, a mold box associated in telescopic relation therewith, a guided carrier for one of these parts, and longitudinally extending rod like projections on said nozzle for forming vent holes in the deposited sand.

3. In combination, a sand blast nozzle longitudinally recessed for the reception of a core iron, a mold box associated in telescopic relation therewith, a guided carrier for one of these parts, and control means governing recessional movement of said carrier.

4. In combination, an annular sand blast nozzle preventing a longitudinal bore for the passage of a core-iron, a mold box associated in telescopic relation therewith, a guided carrier for one of these parts, and control means governing recessional movement of said carrier.

5. In combination, a sand blast nozzle, vane devices within said nozzle, a mold box associated in telescopic relation therewith, a guided carrier for the nozzle, and control means governing recessional movement of said carrier.

6. In combination, a sand blast nozzle, a mold box associated in telescopic relation therewith, a swingable mounting for one of these parts, a guided carrier for the other of these parts, and control means governing recessional movement of said carrier.

7. In combination, a mold box, a sand blast nozzle associated in telescopic relation therewith, a guided carrier for one of these parts whereby the nozzle can penetrate into and recede from the mold box, control means governing recessional movement of said carrier, and an automatic cut-off operative for shutting off sand blast at the end of a recessional stroke.

8. In combination, a divided mold box comprising hingedly connected parts, a sand blast nozzle associated in telescopic relation therewith, a guided carrier for said nozzle whereby the latter can be caused to penetrate into or recede from sand mold box, a swingable support for said mold box, a linkage operating between a mold part and a fixed object whereby said mold part is hingedly opened out when said support is swung in one direction, and control means governing recessional movement of said carrier.

9. In combination, an annular sand blast nozzle, a mold box associated in telescopic relation with said nozzle, a movable support for one of these parts whereby there may be a recession of the nozzle orifice from the advancing face of deposited sand, and a pattern device surrounded by said nozzle.

10. In combination, an annular sand blast nozzle, a mold box associated in telescopic relation with said nozzle, a movable support for one of these parts, and a pattern device connected with the movable part.

11. In combination, an annular sand blast nozzle with a through bore, a mold box associated in telescopic relation with said nozzle, a movable support for one of these parts, and a pattern device extending through the bore of said nozzle.

12. In combination, a sand blast nozzle fitted with a pattern device, a mold box associated in telescopic relation with said nozzle and pattern device, and a movable support for one of these parts whereby there may be a recession of the nozzle and pattern device from the deposited sand.

13. In combination, a pattern device, an annular sand blast nozzle associated in telescopic relation with said pattern device, a movable support for one of these parts, and a tubular extension prolonging the outer shell of the nozzle beyond the orifice thereof and providing a mold box spaced around said pattern device.

14. In combination, a hollow pattern device, an annular sand blast nozzle associated in telescopic relation with said pattern device and having an inner diameter greater than the external diameter of said pattern device, a movable support for one of these parts, and a tubular extension prolonging the outer shell of the nozzle beyond the orifice thereof and providing a mold box space around said pattern device.

15. In combination, an annular sand blast nozzle, a mold box associated in telescopic relation with said nozzle, a movable support for one of these parts, a pattern device extending through said mold box and coverable by said nozzle, and a tubular member surrounding the pattern device and adapted for circularly dividing the annular space between said pattern device and mold box.

16. In combination, an annular sand blast nozzle, a mold box associated in telescopic relation with said nozzle, a movable support for one of these parts, a pattern device extending through said mold box and coverable by said nozzle, and a tubular member carried by said nozzle and extending inwardly into the annular orifice of said nozzle and outwardly beyond said orifice.

17. In combination, an annular sand blast nozzle, a mold box associated in telescopic relation with said nozzle, a movable support for one of these parts, a pattern device extending through said mold box and coverable by said nozzle, a tubular member adapted for dividing the nozzle delivery into two annular deposits, and pin-like projections extended from the nozzle for the production of passages in the sand mold.

18. In combination, an annular sand blast nozzle, a mold box associated in telescopic relation with said nozzle, a movable support for one of these parts, a pattern device extending through said mold box and coverable by said nozzle, and a revolubly supported tubular member adapted for dividing the nozzle delivery into two annular deposits.

19. In combination, a mold box, a sand blast nozzle associated therewith in telescopic relation, said mold box and nozzle being supported for relative movement therebetween, whereby relative recessional movement of said parts will be caused by the force of the sand expelled from said nozzle, and means for controlling said recessional movement.

20. In combination, a mold box, a sand blast nozzle associated in telescopic relation therewith, means for effecting recessional movement therebetween, and means for controlling said movement in accordance with the advance of the face of the sand deposit.

CARL BILLAND.